(12) United States Patent
Pachler et al.

(10) Patent No.: US 9,734,445 B2
(45) Date of Patent: Aug. 15, 2017

(54) ELECTRONIC DOCUMENT WITH TWO ANTENNAS

(71) Applicant: Infineon Technologies AG, Neubiberg (DE)

(72) Inventors: Walther Pachler, Graz (AT); Matthias Emsenhuber, Graz (AT); Josef Haid, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 19 days.

(21) Appl. No.: 14/038,875

(22) Filed: Sep. 27, 2013

(65) Prior Publication Data

US 2015/0090798 A1    Apr. 2, 2015

(51) Int. Cl.

| | | |
|---|---|---|
| G06K 19/06 | (2006.01) | |
| G06K 19/07 | (2006.01) | |
| B42D 25/305 | (2014.01) | |
| B42D 25/23 | (2014.01) | |
| B42D 25/24 | (2014.01) | |

(52) U.S. Cl.
CPC ......... G06K 19/0724 (2013.01); B42D 25/23 (2014.10); B42D 25/24 (2014.10); B42D 25/305 (2014.10)

(58) Field of Classification Search
CPC ....... G06K 19/07749; G06K 19/07345; G06K 19/0717; G06K 19/0723; G06K 19/07767; G06K 7/0008; G06K 7/10178; G06K 19/073; G06K 19/07798; G06K 19/0716; G06K 19/0739; G06K 19/07758; G06K 7/10297; G06K 7/10356; G06K 19/072; G06K 19/0707; G06K 19/0712; G06K 19/0701; G06K 19/0715; G06K 19/0702; G06K 19/0708; G06K 19/0726; G06K 19/0711; G06K 19/0719; G08B 13/2448; H04W 12/06
See application file for complete search history.

(56) References Cited

U.S. PATENT DOCUMENTS

| | | | |
|---|---|---|---|
| 2004/0074975 A1* | 4/2004 | Gundlach et al. | ............ 235/492 |
| 2005/0212674 A1* | 9/2005 | Desmons et al. | .......... 340/572.7 |
| 2006/0232419 A1* | 10/2006 | Tomioka et al. | .......... 340/572.7 |
| 2008/0058029 A1* | 3/2008 | Sato et al. | ..................... 455/573 |
| 2008/0088417 A1* | 4/2008 | Smith | ................ G06K 19/0707 340/10.41 |

(Continued)

OTHER PUBLICATIONS

RFID Handbook, Chapter 3 (pp. 29-59), Klaus Finkenzeller, 3rd Edition, John Wiley & Sons Ltd., 2010, ISBN-13:978-0470695067.

*Primary Examiner* — Thien T Mai
(74) *Attorney, Agent, or Firm* — Viering, Jentschura & Partner mbB

(57) ABSTRACT

In various embodiments, a circuit arrangement is provided, including a first antenna tuned to a first frequency range, a second antenna tuned to a second frequency range being different from the first frequency range, a controller coupled to the first antenna and the second antenna, wherein the controller is configured to receive its operational power via at least one of the first antenna and the second antenna, and a deactivating structure configured to deactivate the communication of the controller via the second antenna upon reception of electromagnetic waves with the first frequency range via the first antenna.

17 Claims, 5 Drawing Sheets

(56) References Cited

U.S. PATENT DOCUMENTS

2010/0080270 A1* 4/2010 Chen et al. .................. 375/219
2013/0207831 A1* 8/2013 Fullerton ........................ 342/45
2013/0287211 A1* 10/2013 Rhelimi ............. G07C 9/00015
380/270

* cited by examiner

ELECTRONIC DOCUMENT WITH TWO ANTENNAS

TECHNICAL FIELD

Various embodiments relate to an electronic document with two antennas.

BACKGROUND

Identification documents such as passports or identification cards are nowadays often equipped with means for wireless communication. For example, since 2007 the U.S. government has been issuing e-passports (electronic passports) only, which include a contactless integrated circuit in the back cover. The integrated circuitry stores the data which is visually displayed on the photo page of the passport together with a digital version of the photograph of the passport holder. With the help of facial recognition technology, the digital photograph may be used for biometric comparison at international borders.

U.S. citizens crossing the border, for example to Canada or Mexico, are required to have both a passport and a further personal identification card, a so called passport card. In order to wirelessly read out data from e-passports, HF systems are employed, whereas the read out of personal identification cards, such as the passport card, is based on UHF systems. Both documents carry identification numbers which are verified during border crossing. Care has to be taken that the verification process of the two documents does not take place at the same time, which may, for example, entail both documents accessing the same database at the same time in order to verify the checked document. Therefore, simultaneous verifications of both kinds of may need to be avoided. In addition, the citizen crossing the border is required to carry both documents as both verification systems are used independently from one another.

SUMMARY

In various embodiments, a circuit arrangement is provided, including a first antenna tuned to a first frequency range, a second antenna tuned to a second frequency range being different from the first frequency range, a controller coupled to the first antenna and the second antenna, wherein the controller is configured to receive its operational power via at least one of the first antenna and the second antenna, and a deactivating structure configured to deactivate the communication of the controller via the second antenna upon reception of electromagnetic waves with the first frequency range via the first antenna.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
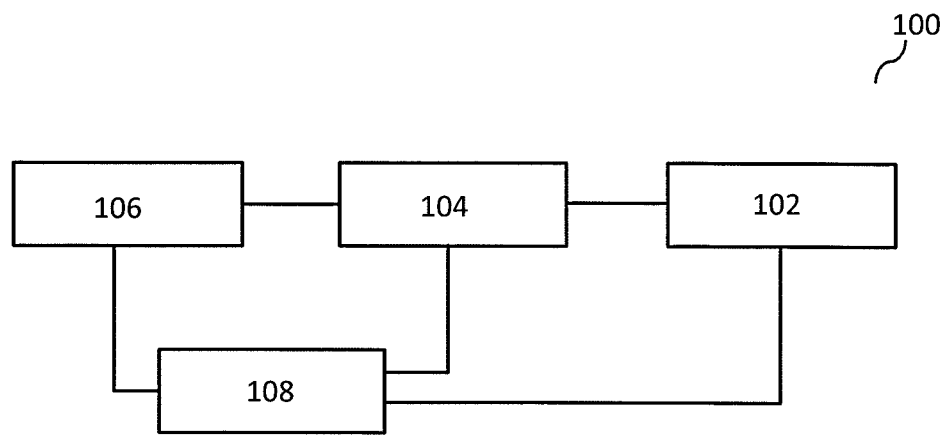
FIG. 1 shows the circuit arrangement according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

With the circuit arrangement according to various embodiments embedded in a passport, for example, it may be possible to combine to electronic documents whose communication is based on different frequency ranges in one electronic document. In other words, only one electronic document may be needed when crossing the border, as the communication system of an e-passport (system based on HF (high frequency)) and the communication system of an personal identification card (system based on UHF (ultra high frequency)) may be combined in one electronic document, e.g. the e-passport. The circuit arrangement according to various embodiments may include two wireless communication systems, e.g. a HF communication system and a UHF communication system, in such a way that both systems may not influence each other. One wireless communication system may be the dominant one, i.e. it may suppress the wireless communication of the other system as soon as electromagnetic waves of a corresponding wavelength are received by the dominant communication system. For example, one communication system may be configured as a near field communication system whereas the other communication system may be configured as a far field communication system. Outside the range of the near field, only the far field may be present such that the communication system configured for communication via the far field may freely operate. Within the range of the near field the far field will also be present and the communication system configured for communication via the near field may suppress the communication of the other system over the far field in order to prevent simultaneous action of both communication systems. In other words, the circuit arrangement according to various embodiments may ensure that at any given time, only one communication system, e.g. either the UHF communication system or the HF communication system, may operate, i.e. transmit and/or receive data via a corresponding electromagnetic field. Speaking in terms of identification documents, both electronic identification documents (e.g. the e-passport and the personal identification card, e.g. the passport card) may be combined in one electronic identification document. However, the danger of simultaneous data access by both electronic identification document systems may be prevented. The UHF system may include an antenna configured to communicate via the far field (i.e. an electromagnetic field configured to provide a larger operating range) and the HF system may include an antenna configured to communicate via the near field (i.e. an electromagnetic field configured to provide a smaller operating range). In the case of an e-passport which is based, for example, on an HF wireless communication system, the existing coil antenna tuned to the HF range may be used by a deactivating circuit which is coupled to the coil antenna. The existing HF communication system including, for example, a chip and/or a controller, an antenna, e.g. a coil antenna, and further electronic components, does not need to be adapted in any way. The deactivating circuit may include a rectifier and a switch and it may be configured to deactivate the UHF communication system as soon as the electronic document enters a range in which the HF communication system may be interrogated by the near field. UHF communication systems are also often used in logistic applications. Here the farfield is necessary in order to enhance the reading distance up to 10 m. Nearfield applications usually operate in the range of up to 1 m. NFC (Near Field Communication) and proximity cards are examples of such applications.

FIG. 1 shows a circuit arrangement 100 according to various embodiments. The circuit arrangement 100 may include a first antenna 102 which may be tuned to a first frequency range, for example to the high frequency range, for example to a frequency of approximately 13.56 Mhz. The first antenna 102 may be configured as a coil antenna. The circuit arrangement 100 may further include a second antenna 106 which may be tuned to a second frequency range being different from the first frequency range, for example to the ultra high frequency range, for example to a frequency of approximately 868 MHz, which may be predominantly used in Europe, or 915 MHz, which may be predominantly used in the United States. The second antenna 106 may be configured as a dipole antenna. The circuit arrangement 100 may further include a controller 104 coupled to the first antenna 102 and the second antenna 106, wherein the controller 104 may be configured to receive its operational power via at least one of the first antenna 102 and the second antenna 106. This aspect relates to a passive circuit arrangement 100 according to various embodiments which has no battery and therefore draws energy from the interrogating electromagnetic field such that it may act as a passive transponder. Therefore, the communication of data from the controller 104 to a reader (not shown in FIG. 1) via the first antenna 102 or via the second antenna 106 may include the process of the controller 104 receiving energy from the interrogating electromagnetic field via the first antenna 102 or the second antenna 106, respectively. Whether the first antenna 102 or the second antenna 106 is operational, i.e. whether the first antenna 102 or the second antenna 106 used by the circuit arrangement 100 according to various embodiments, predominantly the controller 104, to receive operational energy and/or to transmit data to a reader, may depend on the frequency of the interrogating field and the distance between the location of the circuit arrangement 100 according to various embodiments from the reader emitting the interrogating electromagnetic field. For example, the first antenna 102 may be tuned to a frequency from the HF range, e.g. to 13.56 MHz. The communication system based on the HF range may be configured to provide a shorter operating distance of up to 1 m. The second antenna 106 may be tuned to a frequency from the UHF range, e.g. to MHz which may be predominantly used in Europe or 915 MHz which may be predominantly used in the United States. The communication system based on the UHF range may be configured to provide a longer operating distance of up to 10 m. Therefore, the first antenna 102 may be used in far field applications, i.e. it may operate at longer operating ranges, whereas the second antenna 106 may be used in near field applications, i.e. it may operate at shorter operating ranges. At far field operating range, only the far field (i.e. the electromagnetic field via which the circuit arrangement 100 according to various embodiments may be configured to be interrogated at longer distances) may be present, hence the circuit arrangement 100 may be only interrogated via the second antenna 106. However, at near field operating range, both the near field (i.e. the electromagnetic field via which the circuit arrangement 100 according to various embodiments may be configured to be interrogated at shorter distances) and the far field are present. Therefore, in principle, the circuit arrangement 100 may be interrogated via the first antenna 102 and the second antenna 106 at near field ranges. In order to prevent simultaneous access to a data base by a first identification system using the first antenna 102 and by a second identification system using the second antenna 106, the circuit arrangement 100 according to various embodiments may further include a deactivating structure 108 configured to deactivate the communication of the controller 104 via the second antenna 106 upon reception of electromagnetic waves with the first frequency range via the first antenna 102. The deactivating structure 108 may be coupled to the first antenna 102, to the controller 104 and to the second antenna 106. When the first antenna 102 receives electromagnetic waves with the frequency it is tuned to within the near field operation distance, the deactivating structure 108 may be configured to deactivate the communication of the controller 104 via the second antenna 106, i.e. via the far field which is of course also present at near field operation distances. In effect, the deactivating structure 108 may make the operation mode of the circuit arrangement 100 via the first antenna 102 to be the dominant operating mode as this mode may be able to shut down and/or override the operation mode of the circuit arrangement 100 via the second antenna 106.

The specified frequency values are merely exemplary frequencies such that any one of the both antennas may be of course tuned to any other frequency range, for example to any other frequency range or frequency from the RFID (radio-frequency identification) frequency band.

When the circuit arrangement 100 according to various embodiments is used in an electronic document, the controller 104 may be configured as a dual tag, i.e. it may, for example, function as an HF tag during communication of the circuit arrangement 100 via the HF electromagnetic field (near field application) and it may function as a UHF tag during communication of the circuit arrangement 100 via the UHF electromagnetic field (far field application). In an alternative embodiment, the controller 104 may be provided in the form of two separate controllers in order to have dedicated controllers for each wireless communication system, i.e. a first controller which may receive its operational energy from and communicate via a first electromagnetic field, e.g. a HF electromagnetic field, via the first antenna 102, and a second controller which may receive its operational energy from and communicate via a second electromagnetic field, e.g. a UHF electromagnetic field, via the second antenna 106. The deactivating structure 108 may then be coupled to the first controller such that as soon as the first controller receives its operational power via the first antenna 102, the deactivating structure 108 may deactivate the communication of the second controller via the second antenna 106. The first controller may be configured as a HF tag (HF transponder) and the second controller may be configured as a UHF tag (UHF transponder).

Figure 2A:
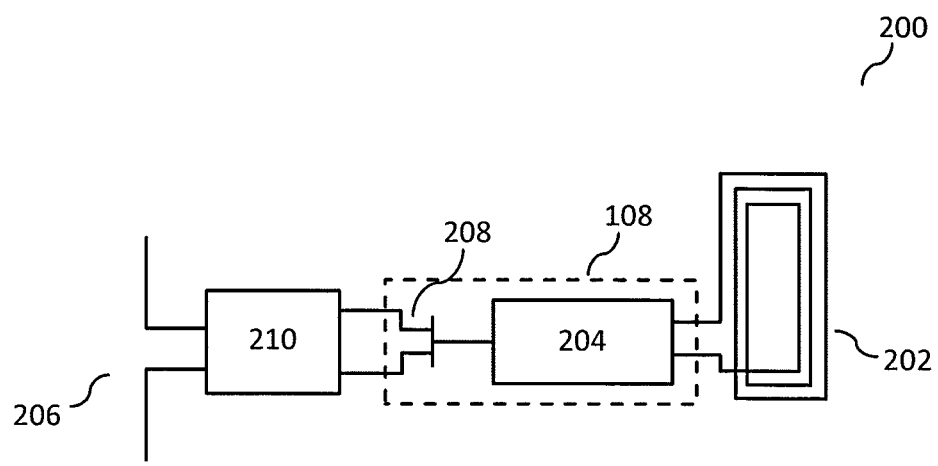
FIGS. 2A to 2D show various further embodiments of the circuit arrangement.

FIG. 2A shows a further implementation of the circuit arrangement 200 according to various embodiments. The circuit arrangement 200 according to various embodiments may include the first antenna 202 which is configured as a coil antenna. The first antenna 202 may be coupled to a rectifier 204. The rectifier 204 may be configured to convert the AC voltage generated in the first antenna 202 by the corresponding electromagnetic field to a DC voltage. The rectifier 204 may be coupled to a control terminal of a switch 208, for example a transistor. In this exemplary embodiment of the circuit arrangement 200 the deactivating structure 108 may include the rectifier 204 and the switch 208. The switch 208 may be coupled to a controller 210 in such a way that it may cause a short circuit between the terminals of the power supply of the second 210 thereby rendering it inactive. The controller 210 may be configured as a UHF transponder and may be coupled to the second antenna 206. During its operation, the controller 210 may be configured to draw its operational power from the second antenna 206. A further controller may be provided (not shown in FIG. 1) which may be coupled to the first antenna 202 and configured as a HF transponder. The further controller may be configured to draw its operational power from the first antenna 202.

In alternative embodiments, the rectifier 204 may be included in the further controller. In general, the circuit arrangement 200 according to various embodiments may be easily implemented into an electronic document that, for example, already includes circuitry having an antenna and a transponder. In such a case, the existing wireless circuitry may remain unchanged. The second antenna 206 and the controller 210 may be added together with the deactivating structure 108, for example the switch 208 and the rectifier 204. As soon as a voltage is induced in the first antenna 202 by a corresponding electromagnetic field, the rectifier 204 "tapping" the first antenna 202 will provide a DC voltage and the deactivating structure 108 may shut down second controller 210 or, as will be shown in further embodiments, may in general deactivate the communication of the controller 210 via the second antenna 206 by other means.

Figure 2B:
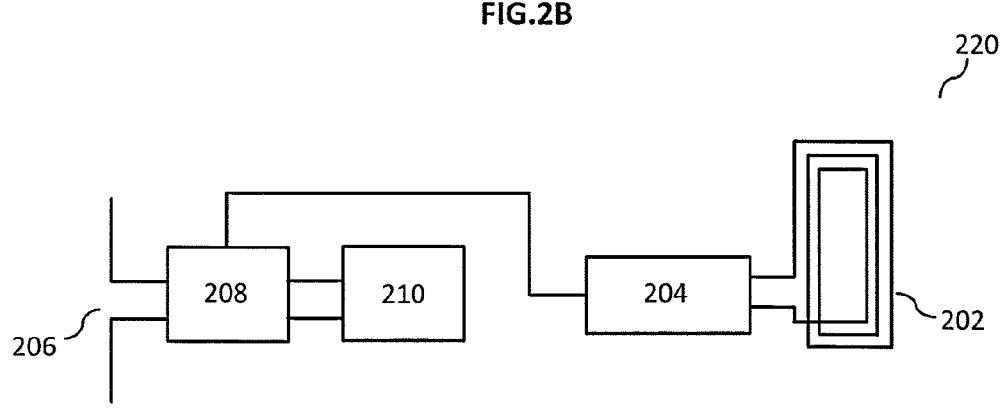

In FIG. 2B a further implementation of the circuit arrangement 220 according to various embodiments is shown which is similar to the embodiment shown in FIG. 2A. Therefore, the same elements are labelled with the same reference numbers.

The difference to the embodiment shown in FIG. 2A is that the switch 208 has a different effect on the circuit including the controller 210 and the second antenna 206 (in the following: far field communication circuit). The switch 208, when activated, short-circuits the second antenna 206 whereby a large enough impedance mismatch is caused such that the far field communication circuit is considered to be switched off. In other words, the short-circuiting of the second antenna 206 by the switch 208, e.g. a transistor, detunes the second antenna 206 from the frequency of the corresponding electromagnetic field to which it would be usually responsive. However, the power supply of the controller 210 is not short circuited as is the case when the far field communication circuit is to be deactivated in the exemplary embodiment of the circuit arrangement 200 shown in FIG. 2A.

Figure 2C:
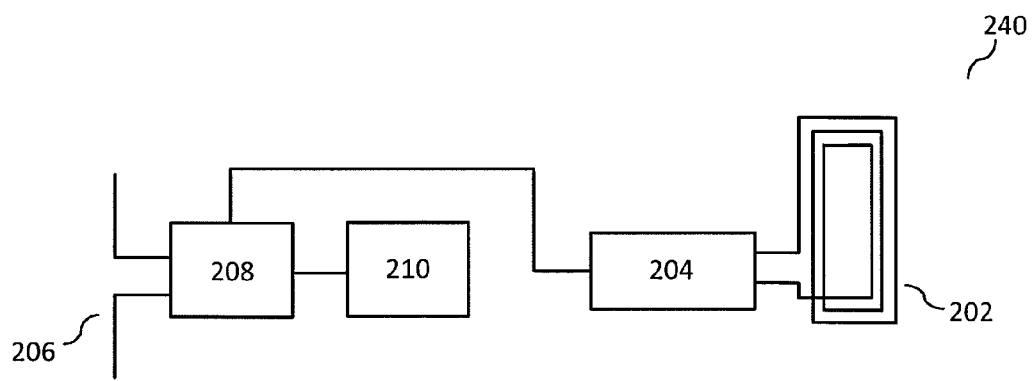

A further circuit arrangement 240 according to various embodiments is shown in FIG. 2C which is similar to the embodiment shown in FIG. 2B. Therefore, the same elements are labelled with the same reference numbers.

The difference to the embodiment shown in FIG. 2B is that the deactivating structure may further include an electronic element with a predefined impedance, for example a capacitor or a inductor. Element 208 representing the switch 208 in FIG. 2C may include that electronic element. Upon reception of electromagnetic waves with the first frequency range via the first antenna 202, the additional electronic element is activated within the far field communication circuit (e.g. from a so far disconnected parallel circuit path) thereby creating a large enough impedance mismatch within the second communication circuit. This may cause a detuning of the second antenna 206 such that an effective reception of electromagnetic waves with the frequency it is originally tuned to is rendered ineffective or impossible. It may be seen that the desired effect—a strong impedance mismatch within the second communication circuit in order to prevent a communication of the controller 210 via the second antenna 206—is the same as the one already described based on the embodiment of the circuit arrangement 220 shown in FIG. 2B.

Figure 2D:
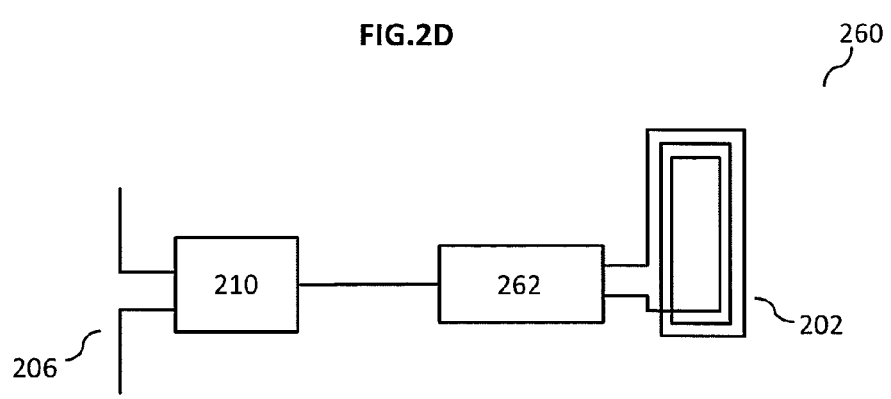

FIG. 2D shows a further implementation of the circuit arrangement 260 according to various embodiments which is similar to the embodiment shown in FIG. 2C. Therefore, the same elements are labelled with the same reference numbers.

In the circuit arrangement 260 according to various embodiments shown in FIG. 2D, the further controller 262 is directly coupled to the controller 210 and is configured to activate and deactivate the controller 210 via software. For example, both controllers may include GPIOs (general-purpose input/output) such that the further controller 262 may output a deactivating signal when electromagnetic waves with the first frequency range are received via the first antenna 202 (which may be seen to be equivalent to the further controller 262 being powered on by the operational energy supplied to it via the first antenna 202). In this embodiment, the rectifier may be included within the further controller 262. In further embodiments, the controller 210 may include a chip select input via which the controller 210 may be enabled or disabled in response to a corresponding signal which may be output by the further controller 262.

Figure 3:
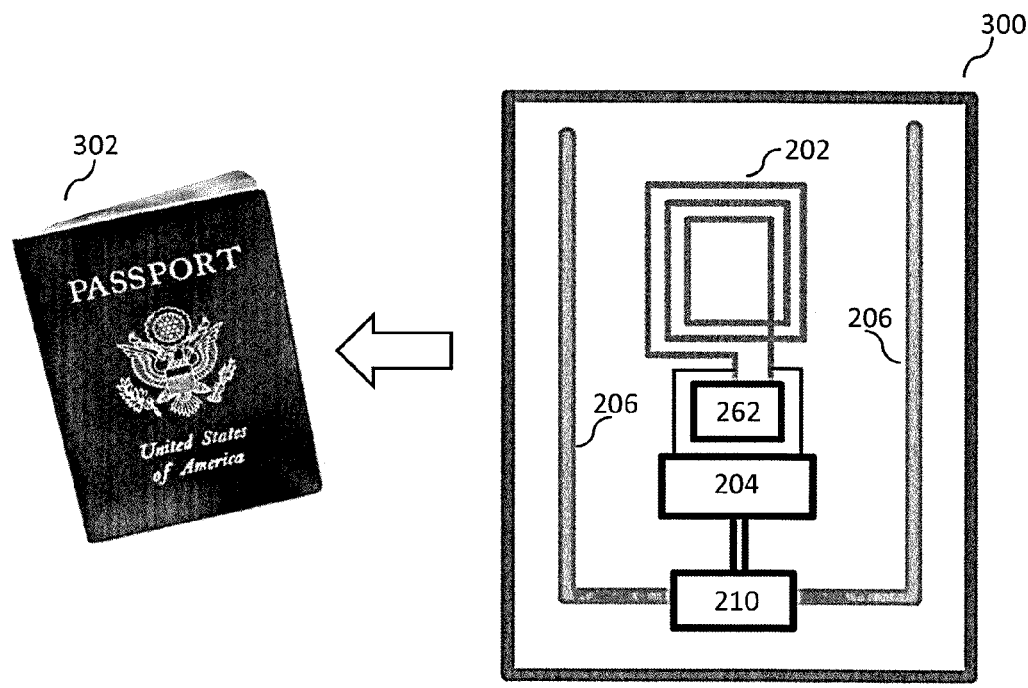
FIG. 3 shows an e-passport including the circuit arrangement according to various embodiments and an exemplary electronic document.

In FIG. 3 a further embodiment of the circuit arrangement 300 is shown which is based on the previous embodiments. The circuit arrangement 300 includes the second antenna 206 which may be a dipole antenna and which is coupled to the controller 210. The arrangement of the second antenna 206 and the controller 210 may be referred to as the far communication system. The second antenna 206 may be tuned to a frequency range from the UHF frequency band, for example by providing further electronic elements in the second communication system circuit such as conductors, capacitors or resistors. In that case, the controller 210 may be configured as a UHF transponder (UHF tag). The circuit arrangement 300 according to various embodiments further includes the first antenna 202 which may be a coil antenna and which is coupled to the further controller 262. The arrangement of the first antenna 202 and the further controller 262 may be referred to as the near field communication system. The first antenna 202 may be tuned to a frequency range from the HF frequency band, for example by providing further electronic elements in the second communication system circuit such as conductors, capacitors or resistors. The further controller 262 may be configured as a HF transponder (HF tag). The circuit arrangement 300 according to various embodiments further includes the rectifier 204. In this embodiment, the rectifier 204 is a separate circuit which is coupled to the first antenna 202 and so to speak taps the first antenna 202. As soon as electromagnetic waves with the first frequency range induce a corresponding voltage in the first antenna 202, the rectifier 204 may generate a DC voltage. That DC voltage originating from the induced AC voltage in the first antenna 202 may be fed to the controller 210 and cause a deactivation of the controller 210 or a detuning of the second antenna 210. Independent of the actual effect on the controller and/or the far field communication system, the circuit arrangement 300 according to various embodiments may be configured such that the reception of electromagnetic waves with the first frequency range via the first antenna 202 may lead to a deactivation of the communication of the d controller 210 via the second antenna 206. In alternative embodiments, in which only one single controller may be provided combining the functionalities of the controller 204 and the further controller 262, the circuit arrangement 300 according to various embodiments may be configured such that the reception of electromagnetic waves with the first frequency range via the first antenna 202 may lead to a deactivation of the communication of the one single controller via the second antenna 206.

One possible application of the circuit arrangement 300 according to various embodiments is also indicated in FIG. 3. The circuit arrangement 300 may be included in an document, for example a passport, which makes it an electronic document, for example an enhanced e-passport. The term enhanced may refer to the fact that the enhanced e-passport may actually include two different electronic documents. The circuit arrangement 300 according to various embodiments may combine two separate electronic documents, for example an e-passport which may include an HF transponder and a personal identification card, such as the passport card, which may include a UHF transponder. One of the electronic documents may be based on a far field application, i.e. it may be configured to be interrogated (read out) at larger distances, for example up to a distance of a few meters, whereas the other electronic document may be based on a near field application, i.e. it may be interrogated at smaller distances, for example up to a distance of a few tens of centimeters. In one exemplary scenario, the electronic document may combine an e-passport which includes a HF transponder and a personal identification card, such as the passport card, which includes a UHF transponder.

At larger distances, only the far field application may be used, i.e. only the UHF transponder of the personal identification card, such as the passport card, may be interrogated by a corresponding electromagnetic field. At smaller distances, both the far field application and the near field application may be sued, i.e. both the UHF transponder of the personal identification card (e.g. passport card) and the HF transponder of the e-passport may be each interrogated by a corresponding electromagnetic field. The interrogation of a transponder of an electronic document may result in a database check in order to verify the authenticity of that electronic document. At distances larger than the operating distance of the HF based identification system only the UHF based identification system may be interrogated and prompt a verification check. At distances within the operating distance of the HF based identification system, both identification systems may be interrogated. In order to prevent simultaneous verification checks, the near field identification system may be configured to suppress the communication of the far field communication system (which, of course, also works at short distances). Expressed in terms of the exemplary embodiment of the circuit arrangement 300 according to various embodiments which is embedded in the electronic document 302, as soon as the electronic document 302 enters the range in which the near field application becomes operational and thus the first antenna 202 receives electromagnetic waves with the first frequency range of a field strength greater than a predefined field strength, the deactivating structure of the circuit arrangement 300 according to various embodiments—in this case the rectifier 204, possibly in combination with a switch or a corresponding software based mechanism—may deactivate the communication of the controller 210 via the second antenna 206, for example in any one of the ways described with respect to FIGS. 2A to 2D. With the communication of the far field application (e.g. the e-passport) blocked, the near field application (e.g. passport card) may be safely interrogated without running the risk of simultaneous verification checks.

In the following, some rectifier topologies which may be used to implement the rectifier, for example the rectifier 204 shown in FIG. 3, will be described with respect to FIGS. 4A to 4D. In general, a simple full-wave rectifier using four diodes may be used to convert the AC voltage induced in the first antenna 202 to a DC voltage. In the context of this application, the converted DC voltage may be seen as a non-constant, i.e. fluctuating voltage, of a constant polarity.

When CMOS (complementary metal-oxide semiconductor) technology is used, MOSFETs (metal-oxide semiconductor field effect transistors) may be used instead of diodes. The gate terminal of the respective MOSFET may be coupled to its drain terminal. Such a configuration is known as diode-connected transistor (or MOS-diode). In order to increase the efficiency, an additional voltage may be applied between the gate terminal and the drain terminal. That additional voltage may be provided from the voltage drop across a transistor to which a current source is coupled (to its source terminal or its drain terminal).

Figure 4A:
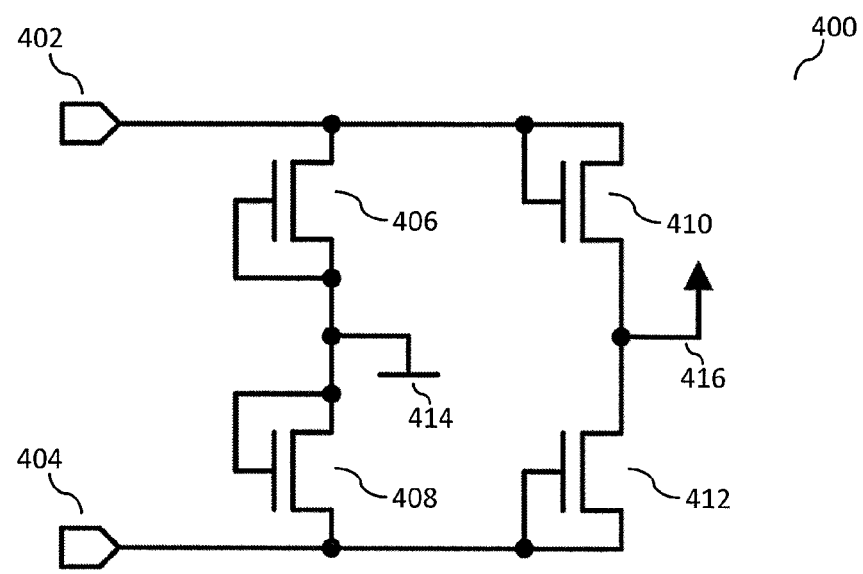
FIGS. 4A to 4D show possible implementations of the rectifier.

In FIG. 4A a rectifier circuit 400 is shown which is based on four NMOS (n-type metal-oxide semiconductor) transistors. The rectifier circuit 400 includes a first input 402 and a second input 404 which may be connected to the first antenna 202 in any one of the embodiments of the circuit arrangement previously shown. The first input 402 is coupled to a source terminal of a first transistor 406 and to a gate terminal and a drain terminal of a third transistor 410. The second input 404 is coupled to a source terminal of a second transistor 408 and to a gate terminal and a drain terminal of a fourth transistor 412. A drain terminal and a gate terminal of the first transistor 406 are coupled to a drain terminal and a gate terminal of the second transistor 408, those terminals forming a node which corresponds to a first terminal 414 which may be configured as a reference terminal. A source terminal of the third transistor 410 is coupled to a source terminal of the fourth transistor 412, those terminals forming a further node which corresponds to a second terminal 416. The rectified output voltage is provided between the first terminal 414 and the second terminal 416. The rectifier circuit 400 is implemented using NMOS transistors, hence it may be referred to as CMOS rectifier. It is to be noted that the rectifier circuit 400 shown in FIG. 4A may be also implemented using PMOS (p-type MOS) transistors.

Figure 4B:
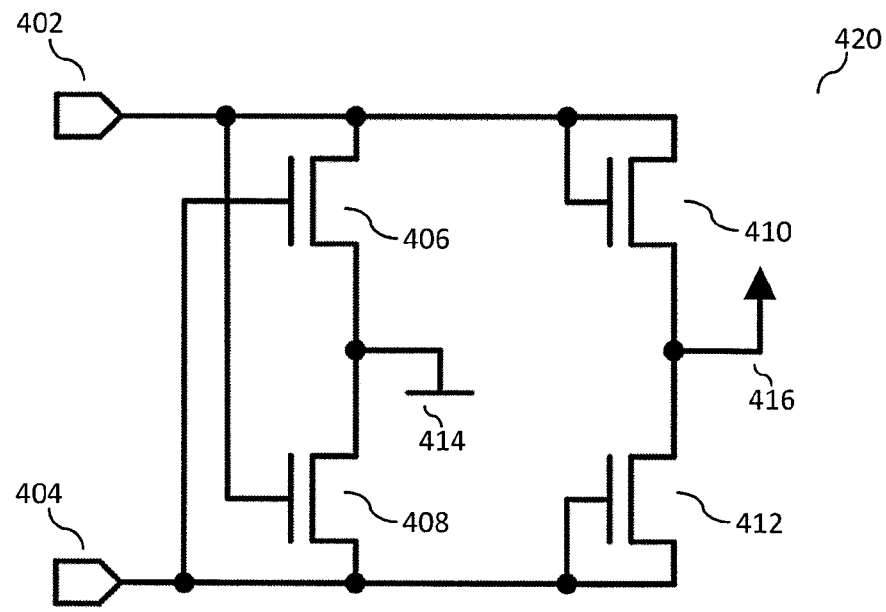

An improved embodiment of the rectifier circuit 400 shown in FIG. 4A is shown in FIG. 4B, which may be referred to as active MOS-diode rectifier. The rectifier circuit 420 shown in FIG. 4B is based on the embodiment shown in FIG. 4A, therefore the same elements are labelled with same reference numbers.

In the embodiment of the rectifier circuit 420 shown in FIG. 4B two passive MOS-diodes from FIG. 4A have been replaced with actively switched (or controlled) MOS transistors. That is, the gate of the first transistor 406 is coupled to the second input 404 instead of being coupled to the drain terminal of the first transistor 406 and to the gate terminal and the drain terminal of the second transistor 408. In an analogous manner, the gate of the second transistor 408 is coupled to the first input 402 instead of being coupled to the drain terminal of the second transistor 408 and to the gate terminal and the drain terminal of the first transistor 406. Other than that, the configuration of the rectifier circuit 420 corresponds to the configuration of the rectifier 400 shown in FIG. 4A.

The first half of the rectifier circuit 420, i.e. the part including the first transistor 406, the first terminal 414 and the second transistor 408, is implemented as an active MOS-diode circuit. The control signals for the active MOS-diodes, i.e. the control signals for the first transistor 406 and the second transistor 408, correspond to the AC input voltage which is coupled to the first input 202 and the second input 204. As already mentioned, the rectifier circuit 420 may be coupled to the first antenna 202, e.g. with its first input 202 to one part of the antenna and with its second input 204 to the other part of the antenna. During operation, the positively charged part of the antenna will switch one of the two active MOS-diodes (e.g. the first transistor 402) and connect it to the first terminal 414, whereby the other part of the antenna (which will be of the other polarity with respect to the positively charged part of the antenna) will be coupled to the second terminal 416.

Figure 4C:
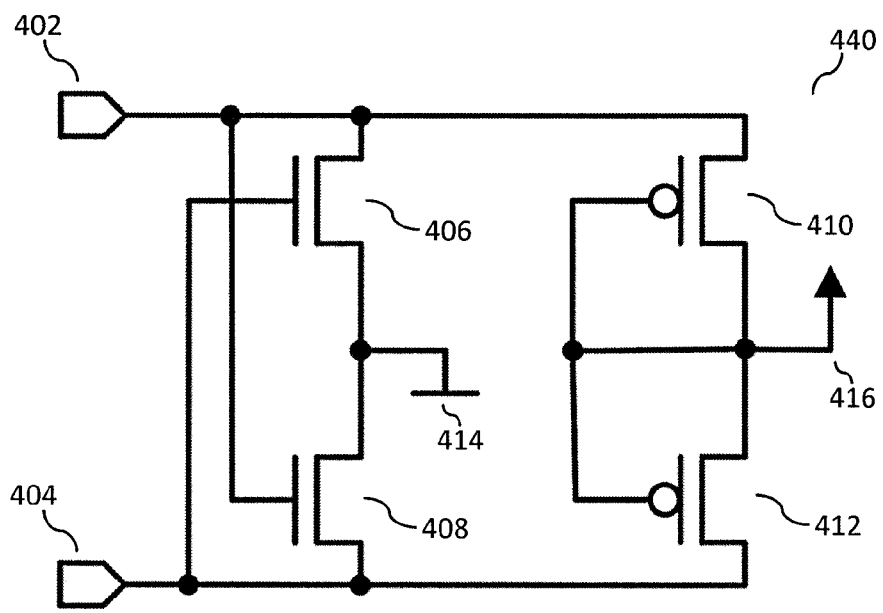

The rectifier circuit 440 shown in FIG. 4C practically corresponds to the rectifier circuit 440 shown in FIG. 4B with the difference that the third transistor 410 and the fourth transistor 412 have been replaced with PMOS transistors. Therefore, the gate of the third transistor 410 and the gate of the fourth transistor 412 are coupled to one another and to the second terminal 416 which coincides with the drain of each of the transistor.

Figure 4D:
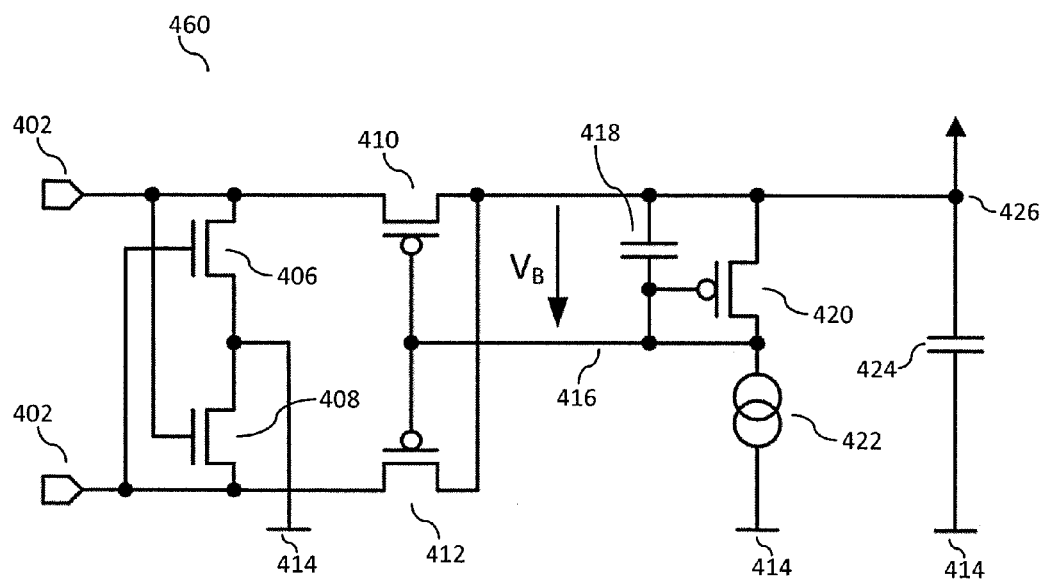

A further possibility to increase the efficiency of the rectifier circuit is shown in FIG. 4D. The rectifier circuit 460 shown in FIG. 4D is based on the rectifier circuit 440 shown in FIG. 4C. Starting with the setup as shown in FIG. 4C, a threshold voltage cancellation circuit is added thereto. The gate terminal of the third transistor 410 and the gate of the fourth transistor 412 are coupled to one another and instead of being coupled to the source terminal of each of the he corresponding transistors (as shown in the setup of FIG. 4C), they are coupled to one side of a first capacitor 418, to a gate terminal of a fifth transistor 420 and to a node located in the electrical path between a first source/drain terminal of the fifth transistor 420 and first terminal of a current source 422. The second source/drain terminal of the fifth transistor 420 is coupled to the other side of the first capacitor 418 and to the drain terminal of the third transistor 410 and to the drain terminal of the fourth transistor 412. The second terminal of the current source 422 is coupled to the reference potential 414. A second capacitor 424 is coupled in parallel to the series arrangement of the current source 422 and the fifth transistor 420, with its one side coupled to the reference potential 414 and its other side coupled to the second source/drain terminal of the fifth transistor 420 and the other side of the first capacitor 418. The rectified output voltage is provided between the first terminal 414 which may correspond to the reference terminal and a third terminal 416 corresponding to a node arranged in the electrical path between the fifth capacitor 424 and the second source/drain terminal of the fifth transistor 420. It is to be noted that the current source 422 in FIG. 4D which may be configured as a constant current source may not be fully operational until the output of the basic rectifier, i.e. the node to which the output terminals of each of the third transistor 410 and the fourth transistor 412 (i.e. to the drain of each of the PMOS transistors in this exemplary embodiment), outputs a sufficiently large rectified output voltage. In other words, the current source 422 may be fully operational after a start up sequence. However, the lack of current from the current source 422 during the start up sequence may be avoided by making use of bandgap reference voltages.

In the rectifier circuit 460 a voltage source is used to cancel the threshold voltage of the third transistor 410 and the fourth transistor 412. The preloading gate voltage $V_B$ for the third transistor 410 and the fourth transistor 412 is derived from the voltage drop across the fifth transistor 420 which is coupled to the current source 422. In other words, the fifth transistor 420 and the current source 422 form a voltage source which is coupled between the drain terminal and the gate terminal of each of the MOS-diodes represented by the third transistor 410 and the fourth transistor 412. With this configuration, the voltage drop across the third transistor 410 and the fourth transistor 412 may be reduced by a value which is equivalent to the threshold voltage of the MOS-diode. However, the rectifier circuit 460 shown in FIG. 4D may suffer from an enlarged reverse current which may be dependent on the preloading gate voltage $V_B$.

As already mentioned, the rectifier circuits shown in FIGS. 4A to 4D may be also designed using PMOS transistors thereby replacing the third transistor 410 and the fourth transistor 412 with PMOS transistors (as may be inferred from comparison of the implementation shown in FIG. 4B and in FIG. 4C) and further, as an option, replacing the first transistor 406 and the second transistor 408 with PMOS transistors.

It is to be noted that while in some embodiments of the circuit arrangement according to various embodiments the controller is shown to include only one instance coupled to the first antenna and to the second antenna (e.g. as shown in FIG. 1), that configuration is to be seen as equivalent to configurations in other embodiments of the circuit arrangement, in which the controller includes at least two instances, for example the controller and the further controller (e.g. as shown in FIG. 2D), wherein the controller is coupled to the second antenna and the further controller is coupled to the first antenna. The configuration including two separate controllers may be seen to include one effective controller which, in effect, is coupled to the first antenna and to the second antenna.

In various embodiments, a circuit arrangement is provided. The circuit arrangement may include a first antenna tuned to a first frequency range; a second antenna tuned to a second frequency range being different from the first frequency range; a controller coupled to the first antenna and the second antenna, wherein the controller is configured to receive its operational power via at least one of the first antenna and the second antenna; and a deactivating structure configured to deactivate the communication of the controller via the second antenna upon reception of electromagnetic waves with the first frequency range via the first antenna.

In various embodiments, the first antenna may be configured as a coil antenna. In various embodiments, the first antenna may be tuned to a frequency from the high frequency range. In various embodiments, the first antenna may be tuned to a frequency of approximately 13.56 MHz. In various embodiments, the second antenna may be configured as a dipole antenna. In various embodiments, the second antenna may be tuned to frequency from the ultra high frequency range. In various embodiments, the second antenna may be tuned to a frequency of approximately 915 MHz. In various embodiments, the deactivating structure may include a rectifier coupled to the first antenna. In various embodiments, the deactivating structure may further include a switch. In various embodiments, the controller may be coupled to the switch and configured to control the state of the switch. In various embodiments, the rectifier may be coupled to the switch and configured to control the state of the switch. In various embodiments, the switch may be coupled to the second antenna and configured to short circuit the second antenna. In various embodiments, the switch may be coupled between the second antenna and at least one electronic component of a predefined impedance, the switch thereby being configured to the alter the impedance of the second antenna. In various embodiments, the circuit arrangement may further include a second controller coupled to the second antenna. In various embodiments, the first controller may be configured as an HF transponder. In various embodiments, the second controller may be configured as a UHF transponder. In various embodiments, the deactivating structure may include a switch configured to short circuit a power supply of the second controller. In various embodiments, the controller may be coupled to the second controller and configured to generate a deactivation signal upon reception of electromagnetic waves with the first frequency range via the first antenna and thereby to deactivate the second controller chip.

In various embodiments, an electronic document with a circuit arrangement embedded therein is provided. The circuit arrangement may include: a first antenna tuned to a first frequency range; a second antenna tuned to a second frequency range being different from the first frequency range; a controller coupled to the first antenna and the second antenna, wherein the controller is configured to receive its operational power via at least one of the first antenna and the second antenna; and a deactivating structure configured to deactivate the communication of the controller via the second antenna upon reception of electromagnetic waves with the first frequency range via the first antenna.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement comprising:
a first antenna tuned to a first frequency range;
a second antenna tuned to a second frequency range being different from the first frequency range; wherein the second antenna is configured as a dipole antenna;
a first controller coupled to the first antenna and the second antenna, wherein the first controller is configured to receive its operational power via at least one of the first antenna and the second antenna; wherein the first controller is connected to at least one of the first antenna and the second antenna; and
a deactivating structure configured to deactivate communication of the first controller via the second antenna upon reception of electromagnetic waves with the first frequency range via the first antenna, wherein the deactivating structure comprises a rectifier coupled to the first antenna and a switch coupled to the second antenna and configured to short circuit the second antenna; wherein the rectifier is coupled to a control terminal of the switch;
wherein the second antenna is tuned to frequency from an ultra high frequency range.

2. Circuit arrangement according to claim 1,
wherein the first antenna is configured as a coil antenna.
3. Circuit arrangement according to claim 1,
wherein the first antenna is tuned to a frequency from a high frequency range.
4. Circuit arrangement according to claim 1,
wherein the first antenna is tuned to a frequency of approximately 13.56 MHz.
5. Circuit arrangement according to claim 1,
wherein the second antenna is tuned to a frequency of approximately 868 MHz.
6. Circuit arrangement according to claim 1,
wherein the first controller is coupled to the switch and configured to control the state of the switch.
7. Circuit arrangement according to claim 1,
wherein the rectifier is coupled to the switch and configured to control the state of the switch.
8. Circuit arrangement according to claim 1,
wherein the switch is coupled between the second antenna and at least one electronic component of a predefined impedance.
9. Circuit arrangement according to claim 1, further comprising:
a second controller coupled to the second antenna.
10. Circuit arrangement according to claim 9,
wherein the first controller is configured as an HF transponder.
11. Circuit arrangement according to claim 9,
further comprising a second controller configured as a UHF transponder.
12. Circuit arrangement according to claim 11,
wherein the deactivating structure comprises a switch configured to short circuit a power supply of the second controller.
13. Circuit arrangement according to claim 11,
wherein the first controller is coupled to the second controller and configured to generate a deactivation signal upon reception of electromagnetic waves with the first frequency range via the first antenna and thereby to deactivate the second controller chip.
14. An electronic document with a circuit arrangement embedded therein, the circuit arrangement comprising:
a first antenna tuned to a first frequency range;
a second antenna tuned to a second frequency range being different from the first frequency range; wherein the second antenna is configured as a dipole antenna;
a controller coupled to the first antenna and the second antenna, wherein the controller is configured to receive its operational power via at least one of the first antenna and the second antenna; wherein the first controller is connected to at least one of the first antenna and the second antenna; and
a deactivating structure configured to deactivate communication of the controller via the second antenna upon reception of electromagnetic waves with the first frequency range via the first antenna, wherein the deactivating structure comprises a rectifier coupled to the first antenna and a switch coupled to the second antenna and configured to short circuit the second antenna;
wherein the second antenna is tuned to frequency from an ultra high frequency range.
15. A circuit arrangement comprising:
a first antenna tuned to a first frequency range;
a second antenna tuned to a second frequency range being different from the first frequency range;
a first controller coupled to the first antenna and the second antenna, wherein the first controller is configured to receive its operational power via at least one of the first antenna and the second antenna; wherein the first controller is connected to at least one of the first antenna and the second antenna; and a deactivating structure configured to deactivate communication of the first controller via the second antenna upon reception of electromagnetic waves with the first frequency range via the first antenna, wherein the deactivating structure comprises a switch coupled to a rectifier having at least two transistors coupled to the first antenna, the switch coupled to the second antenna and configured to short circuit the second antenna.

16. Circuit arrangement according to claim 15, wherein the at least two transistors are configured as metal-oxide semiconductor transistors.

17. Circuit arrangement according to claim 15, wherein the at least two transistors are configured as metal-oxide semiconductor-diodes.

* * * * *